(12) United States Patent
Lee et al.

(10) Patent No.: US 10,056,668 B2
(45) Date of Patent: Aug. 21, 2018

(54) HIGH-FREQUENCY CAVITY RESONATOR FILTER WITH DIAMETRICALLY-OPPOSED HEAT TRANSFER LEGS

(71) Applicant: Space Systems/Loral, LLC, Palo Alto, CA (US)

(72) Inventors: Hoover R. Lee, Redondo Beach, CA (US); Victor Tam, San Bruno, CA (US); Robert N. Seehorn, Redwood City, CA (US); George A. Fiedziuszko, San Jose, CA (US); Gary W. White, Sunnyvale, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 510 days.

(21) Appl. No.: 14/864,669

(22) Filed: Sep. 24, 2015

(65) Prior Publication Data
US 2017/0093004 A1    Mar. 30, 2017

(51) Int. Cl.
| | |
|---|---|
| *H01P 1/207* | (2006.01) |
| *H01P 7/06* | (2006.01) |
| *H01P 1/30* | (2006.01) |
| *B64G 1/58* | (2006.01) |
| *B64G 1/22* | (2006.01) |

(52) U.S. Cl.
CPC ............. *H01P 1/30* (2013.01); *B64G 1/22* (2013.01); *B64G 1/58* (2013.01); *H01P 1/207* (2013.01); *H01P 7/06* (2013.01)

(58) Field of Classification Search
CPC . H01P 1/207–1/211; H01P 7/06–7/065; B64G 1/28; B64G 1/58

USPC ................................. 333/208, 234, 245
See application file for complete search history.

(56) References Cited

U.S. PATENT DOCUMENTS

| | | | |
|---|---|---|---|
| 4,098,261 A | 7/1978 | Watt | |
| 4,120,284 A | 10/1978 | Cotsworth et al. | |
| 4,787,583 A | 11/1988 | Morton | |
| 7,193,489 B2* | 3/2007 | Kornowski | H01P 7/06 333/219.1 |
| 7,375,605 B2* | 5/2008 | Goertz | H01P 7/06 333/229 |

(Continued)

OTHER PUBLICATIONS

"Mer-Made Assembly Parts," Mer-Made Filter, Inc., 1 pp. Retrieved Jul. 16, 2015.

(Continued)

*Primary Examiner* — Dean Takaoka
*Assistant Examiner* — Alan Wong
(74) *Attorney, Agent, or Firm* — Weaver Austin Villeneuve & Sampson LLP (57) ABSTRACT

A heat transfer interface is provided for radio-frequency resonator cavity filters used in vacuum environments such as are encountered by spacecraft and satellites. The heat transfer interface may include a thermally conductive structure that encircles or partially encircles a tubular structure of the resonator cavity filter and heat transfer legs that extend from positions that are on opposite sides of the thermally conductive structure and at approximately the same distance from a support surface to the support surface. The heat transfer legs and the thermally conductive structure may be made from a material or materials having a thermal conductivity of 350 W/(m·K) or greater.

21 Claims, 8 Drawing Sheets

(56) References Cited

U.S. PATENT DOCUMENTS

| | | | | |
|---|---|---|---|---|
| 8,031,036 B2 * | 10/2011 | Panariello | ............... | H01P 7/10 |
| | | | | 333/202 |
| 8,289,108 B2 * | 10/2012 | Reddy | ................ | H01P 1/2084 |
| | | | | 333/202 |
| 8,593,235 B2 * | 11/2013 | Chong | ................ | H01P 1/2053 |
| | | | | 333/203 |
| 2004/0124954 A1 * | 7/2004 | Strohecker | ............ | H01P 1/2138 |
| | | | | 333/208 |

OTHER PUBLICATIONS

"Types of pipe hangers and supports," PlumbingHelp CA, 2 pp. Retrieved Jul. 16, 2015.

* cited by examiner

HIGH-FREQUENCY CAVITY RESONATOR FILTER WITH DIAMETRICALLY-OPPOSED HEAT TRANSFER LEGS

BACKGROUND

Spacecraft often include various radio-frequency (RF) systems that are used to communicate with remote objects, e.g., other satellites or ground-based antennas. These RF systems may operate in a number of radio-frequency bands, including the Ku band, which is typically used for satellite communications, terrestrial microwave communications, and radar systems. In some newer satellite systems, RF systems that operate in the Ka band are being used or are being contemplated for use.

One particular component that may be used in satellite RF systems is a cavity filter, which generally consists of a filled or unfilled (loaded or unloaded) resonator cavity. Some resonator cavities may include a dielectric resonator located within the cavity. The cavity filter generally permits RF energy of certain frequencies to pass, while rejecting RF energy of other frequencies. Such filters are described, for example in U.S. Pat. No. 6,297,715, assigned to the assignee of the present invention, and hereby incorporated into the present application in its entirety. Other examples of known resonator cavity filters are described in U.S. Pat. Nos. 8,952,769 and 9,019,039, assigned to the assignee of the present invention, and hereby incorporated in their entireties into the present application.

The RF energy that is lost during the filtering process is converted into heat energy that must then be dissipated by the filter system. This can prove to be quite challenging in a vacuum environment, such as is experienced in satellites, as cooling strategies involving convection are not effective.

SUMMARY

The systems, methods and devices of this disclosure each have several innovative aspects, no single one of which is solely responsible for the desirable attributes disclosed herein. One innovative aspect of the subject matter described in this disclosure can be implemented in a variety of ways.

In some implementations, an apparatus may be provided that includes a resonator cavity radio frequency (RF) filter including a first tubular section and a heat transfer arrangement configured to thermally couple the first tubular section with a mounting surface when the resonator cavity RF filter is mounted to the mounting surface. The heat transfer arrangement may include a plurality of heat transfer legs and one or more thermally conductive structures, each thermally conductive structure at least partially encircling a first outer surface of the first tubular section and in thermally conductive contact with the first outer surface. Each thermally conductive structure may be coupled with a pair of oppositely disposed thermally conductive flanges, and each thermally conductive flange may extend away from the first tubular section and in a direction substantially parallel to the mounting surface when the resonator cavity RF filter is mounted to the mounting surface. Furthermore, each thermally conductive flange may be coupled with a proximal portion of at least one of the heat transfer legs, each heat transfer leg may have a distal portion that is configured to couple the heat transfer leg with the mounting surface, and the one or more thermally conductive structures, the thermally conductive flanges, and the heat transfer legs may be made from a material or materials having a thermal conductivity or thermal conductivities of at least $$350 \frac{W}{m \cdot K}.$$

In some implementations of the apparatus, the one or more thermally conductive structures and the heat transfer legs coupled thereto may be made from copper or copper alloy.

In some implementations of the apparatus, the resonator cavity RF filter may further include a tuning screw that protrudes through a wall of the first tubular section to allow for tuning of a filtering characteristic of the resonator cavity RF filter.

In some implementations of the apparatus, at least one of the one or more thermally conductive structures may include two C-shaped halves, and each thermally conductive flange of the at least one of the one or more thermally conductive structures may be formed by two tabs, each tab extending from an end of each of the C-shaped halves.

In some implementations of the apparatus, at least one of the one or more thermally conductive structures may be a hoop with a slit forming a circumferential gap between a first end of the hoop and a second end of the hoop, and the at least one of the one or more thermally conductive structures may include a clamping mechanism configured to draw the first end of the hoop towards the second end of the hoop to reduce the circumferential gap when the clamping mechanism is engaged.

In some implementations of the apparatus, at least one of the one or more thermally conductive structures may be an unbroken hoop having an inner diameter within 0.26 mm of the diameter of the first outer surface in the location where the at least one of the one or more thermally conductive structures at least partially encircles the first tubular section.

In some implementations of the apparatus, the apparatus may further include a conformal thermal interface material that is interposed between the first tubular section and at least one of the one or more thermally conductive structures.

In some implementations of the apparatus, at least one of the heat transfer legs may include two pieces, and at least one of the pieces may include a hole or slot through which a fastener may be passed in order to connect the piece to the other piece, wherein the hole or slot is sized so as to allow the distance between the distal portion of the heat transfer leg and proximal portion of the heat transfer leg to be changed when the fastener is in a loosened state.

In some implementations of the apparatus, the heat transfer legs coupled with at least one of the one or more thermally conductive structures may be spaced apart from one another by at least the diameter of the first tubular section at the location where that thermally conductive structure encircles the first tubular section.

In some implementations of the apparatus, at least one of the heat transfer legs may include a braided, flexible portion in between the proximal portion and the distal portion.

In some implementations, a spacecraft may be provided. The spacecraft may include a main body, a mounting surface located on or in the main body, and a payload subsystem including: a resonator cavity radio frequency (RF) filter including a first tubular section and a heat transfer arrangement configured to thermally couple the first tubular section with a mounting surface when the resonator cavity RF filter is mounted to the mounting surface. The heat transfer arrangement may include a plurality of heat transfer legs and one or more thermally conductive structures, each thermally conductive structure at least partially encircling a first outer surface of the first tubular section and in thermally conductive contact with the first outer surface. In such implementations, each thermally conductive structure may be coupled with a pair of oppositely disposed thermally conductive flanges, each thermally conductive flange extending away from the first tubular section and in a direction substantially parallel to the mounting surface when the resonator cavity RF filter is mounted to the mounting surface, each thermally conductive flange may be coupled with a proximal portion of at least one of the heat transfer legs, each heat transfer leg may have a distal portion that is configured to couple the heat transfer leg with the mounting surface, and the one or more thermally conductive structures, the thermally conductive flanges, and the heat transfer legs may be made from a material or materials having a thermal conductivity or thermal conductivities of at least $$350 \frac{W}{m \cdot K}.$$

In some implementations of the spacecraft, the one or more thermally conductive structures and the heat transfer legs coupled thereto may be made from copper or copper alloy.

In some implementations of the spacecraft, the resonator cavity RF filter may further include a tuning screw that protrudes through a wall of the first tubular section to allow for tuning of a filtering characteristic of the resonator cavity RF filter.

In some implementations of the spacecraft, at least one of the one or more thermally conductive structures may include two C-shaped halves, and each thermally conductive flange of the at least one of the one or more thermally conductive structures may be formed by two tabs, each tab extending from an end of each of the C-shaped halves.

In some implementations of the spacecraft, at least one of the one or more thermally conductive structures may be a hoop with a slit forming a circumferential gap between a first end of the hoop and a second end of the hoop, and the at least one of the one or more thermally conductive structures may include a clamping mechanism configured to draw the first end of the hoop towards the second end of the hoop to reduce the circumferential gap when the clamping mechanism is engaged.

In some implementations of the spacecraft, at least one of the one or more thermally conductive structures may be an unbroken hoop having an inner diameter within 0.26 mm of the diameter of the first outer surface in the location where the at least one of the one or more thermally conductive structures at least partially encircles the first tubular section.

In some implementations of the spacecraft, the spacecraft may further include a conformal thermal interface material that is interposed between the first tubular section and at least one of the one or more thermally conductive structures.

In some implementations of the spacecraft, at least one of the heat transfer legs may include two pieces, and at least one of the pieces may include a hole or slot through which a fastener may be passed in order to connect the piece to the other piece, and the hole or slot may be sized so as to allow the distance between the distal portion of the heat transfer leg and the proximal portion of the heat transfer leg to be changed when the fastener is in a loosened state.

In some implementations of the spacecraft, the heat transfer legs coupled with at least one of the one or more thermally conductive structures may be spaced apart from one another by at least the diameter of the first tubular section at the location where that thermally conductive structure encircles the first tubular section.

In some implementations of the spacecraft, at least one of the heat transfer legs may include a braided, flexible portion in between the proximal portion and the distal portion.

In some implementations of the spacecraft, the spacecraft may further include a resonator cavity radio frequency (RF) filter including at least one tubular section with a center axis and having an external diameter D and a thermally conductive path configured to conduct heat from the at least one tubular section to a mounting surface when the resonator cavity RF filter is mounted to the mounting surface. In such implementations, the at least one thermally conductive path may include one or more heat straps and a plurality of thermally conductive heat transfer legs. Each heat strap may be disposed around and thermally coupled with an outer surface of the at least one tubular section, each heat strap may be configured to conduct heat flowing outward from the outer surface in a direction substantially parallel to the mounting surface when the resonator cavity RF filter is mounted to the mounting surface, and each heat strap may be configured to be conductively coupled with the mounting surface by at least two heat transfer legs when the resonator cavity RF filter is mounted to the mounting surface. In such implementations, each heat transfer leg may include a proximal portion configured to be coupled with the heat strap at a location spaced a distance of at least D/2 from the center axis and parallel to the mounting surface when the resonator cavity RF filter is mounted to the mounting surface and a distal portion that is coupled with the mounting surface when the resonator cavity RF filter is mounted to the mounting surface.

Details of one or more implementations of the subject matter described in this specification are set forth in the accompanying drawings and the description below. Other features, aspects, and advantages will become apparent from the description, the drawings, and the claims. Note that the relative dimensions of the following figures, unless otherwise noted, may not be drawn to scale.

BRIEF DESCRIPTION OF THE DRAWINGS

The included drawings are for illustrative purposes and serve only to provide examples of possible structures for the disclosed inventive filters and multiplexers. These drawings in no way limit any changes in form and detail that may be made by one skilled in the art without departing from the spirit and scope of the disclosed embodiments.

Throughout the drawings, the same reference numerals and characters, or reference numbers sharing the same last two digits, unless otherwise stated or suggested by the text or Figures, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the disclosed subject matter, as defined by the appended claims.

FIGS. 1 through 8 are drawn to-scale within each Figure, although the scale from Figure to Figure may vary.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present; the term "coupled" may also refer to two elements that are coupled via a contiguous structure, e.g., a single, molded part may have a "tab" that is coupled with a "body." Furthermore, "connected" or "coupled" as used herein may include wirelessly connected or coupled. It will be understood that although the terms "first" and "second" are used herein to describe various elements, these elements should not be limited by these terms. These terms are used only to distinguish one element from another element. As used herein, the term "and/or" includes any and all combinations of one or more of the associated listed items. The symbol "/" is also used as a shorthand notation for "and/or".

The terms "spacecraft", "satellite" may be used interchangeably herein, and generally refer to any orbiting satellite or spacecraft system.

The techniques and structures described herein relate to improved heat-transfer systems for thermal control of resonator cavity filters. Such techniques and structures may be of particular use for managing heat in cavity resonator RF filters designed for use with RF signals at frequencies above the Ku and C bands, such as signals in the Ka band, because of the smaller filter size corresponding to the higher frequency, which presents packaging challenges. For example, there is less room for tool access in Ka band cavity filter assemblies as compared with Ku band cavity filter assemblies. The smaller size of Ka cavity filters is also problematic in that the heat generation per unit volume in such filters is typically higher than in a Ku band filter used to process signals of the same strength. The improved heat dissipation system utilizes thermally conductive structures or heat straps that have thermally conductive flanges that are parallel to the surface to which the resonator cavity filters are mounted and heat transfer legs spanning between each thermally conductive flange and the mounting surface. This has at least two beneficial effects.

The first is that it is easier to access the various fasteners that are used in the assembled resonator cavity filter system, especially for smaller-diameter (~1 in diameter) resonator cavity filters as may be used in Ka-band applications, as compared with the resonator cavity filters (~2 in diameter) used in Ku-band applications. While all structures are thermally conductive to some degree, it is to be understood that the phrase "thermally conductive," as used herein, refers to a structure having a high degree of thermal conductivity, e.g., such as structures made of copper, silver, gold, or various high-thermal-conductivity composites. Generally speaking, such structures may be made of materials generally having thermal conductivities of 350 W/(m·K) or higher.

The second is that the heat flow out of the thermally conductive structures is split between two diametrically-opposed locations about the circumference of the tubular section. This results in a more even heat distribution within the resonator cavity filter, which also causes the cavity filter to experience a lower thermal gradient. In the presently disclosed heat dissipation system, an RF resonator cavity filter may be supported above a mounting surface by a mounting interface. The mounting interface may include structural components that are designed to provide structural support to the resonator cavity filter, e.g., supporting the resonator cavity filter during launch and maneuvering operations, as well as heat transfer components that are designed to provide thermally conductive flow paths for heat generated by the resonator cavity filter during use. It is to be understood that while the structural components are designed to provide structural support to the resonator cavity filter, they may also serve as additional conductive heat transfer paths in addition to the conductive heat transfer paths provided by the heat transfer components. Similarly, while the heat transfer components are designed to conduct heat from the resonator cavity filter, the heat transfer components may, in some implementations, also provide some degree of structural support to the resonator cavity filter.

In the improved heat dissipation system that the present inventors envisaged, a resonator cavity filter is encircled or partially encircled by a thermally conductive structure that has two oppositely-located thermally conductive flanges that extend away from the thermally conductive structure in directions that are substantially parallel to the mounting surface to which the resonator cavity filter is coupled. As used herein, the term "substantially parallel" with respect to the relationship of the thermally conductive flanges to the mounting surface includes thermally conductive flanges that extend away from the thermally conductive structure in directions within ±15° of parallel to the mounting surface. With respect to mounting surfaces that are not planar, this parallelism is understood to be evaluated with respect to a reference plane that is perpendicular to a plane passing through a center of the resonator cavity filter and that passes through the interface between at least one of the heat transfer components and the mounting surface.

In such a heat dissipation system, heat transfer components may span between such thermally conductive flanges and the mounting surface, thereby conducting heat from the thermally conductive structure to the mounting surface. Such heat transfer components may be much longer than in systems in which the heat transfer components span between the mounting surface and the point of the resonator cavity filter closest to the mounting surface, e.g., they may be longer than such heat transfer components by at least a distance equal to one half the diameter or, for non-round resonator cavity filters, cross-sectional width along a direction perpendicular to the mounting surface of the resonator cavity filter. The increased thermal resistance per unit area, however, is offset by a more even heat flow around the circumference of the resonator cavity filter.

Figure 1:
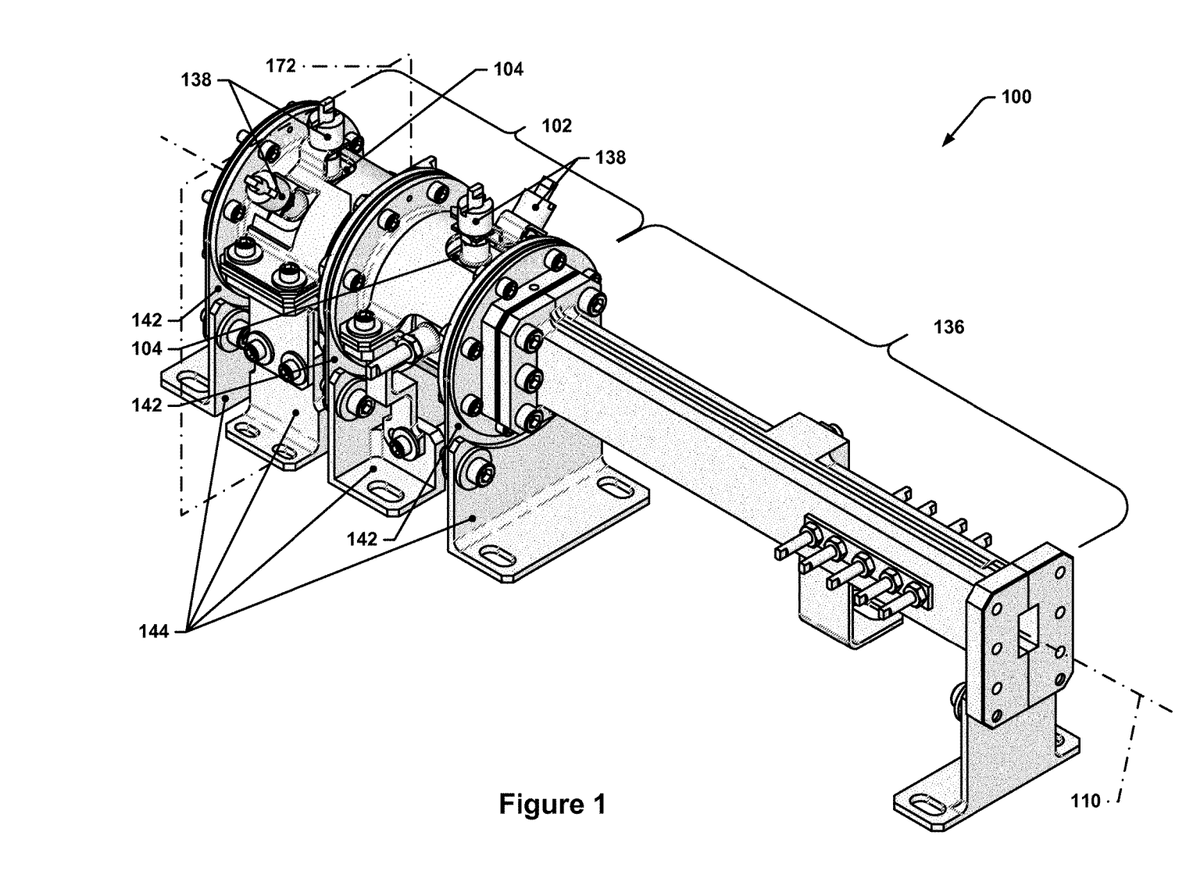
FIG. 1 depicts an isometric view of an example RF filter system.
Figure 2:
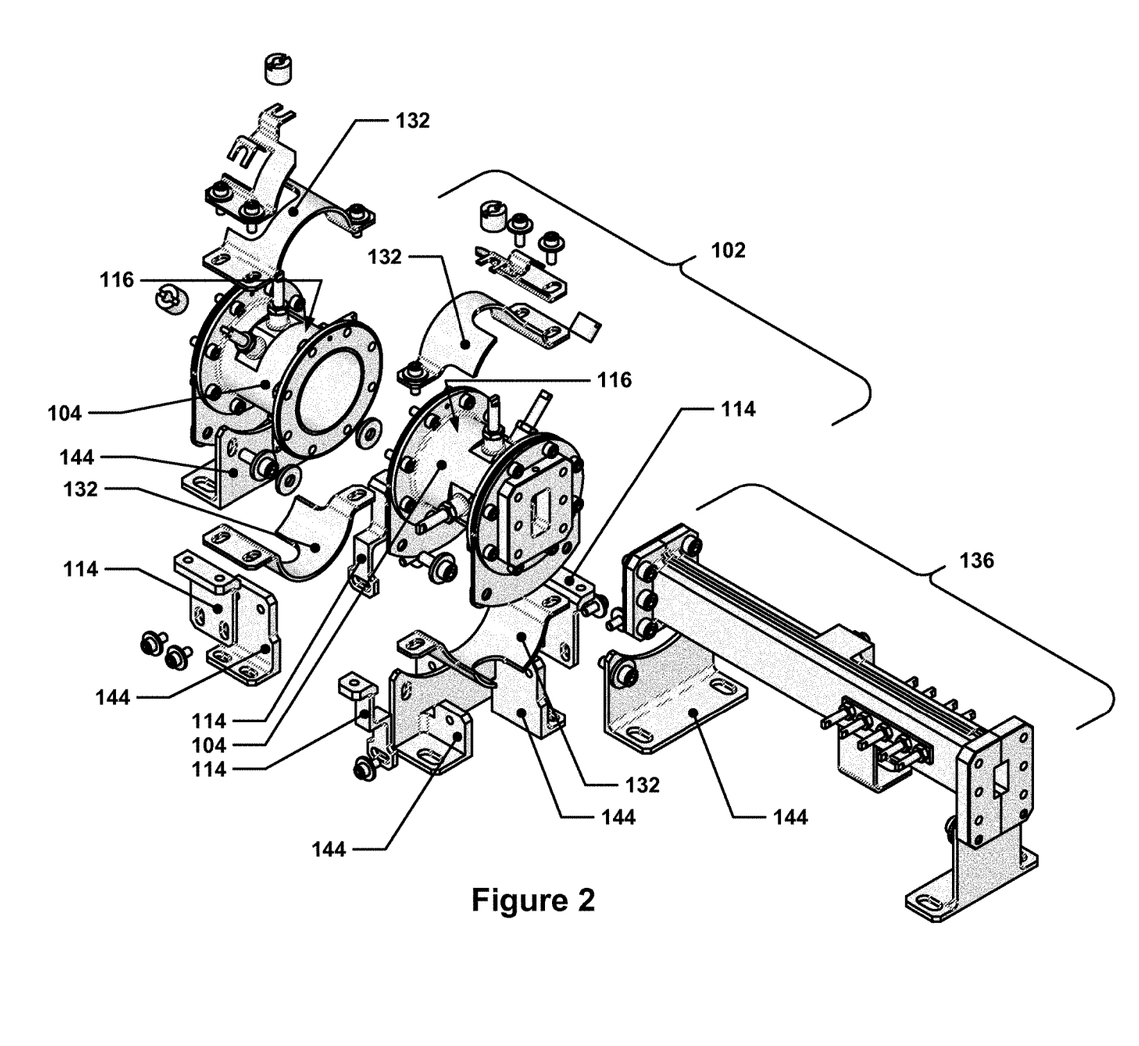
FIG. 2 depicts an isometric exploded view of the example RF filter system of FIG. 1.

FIG. 1 depicts an isometric view of an example RF filter system. FIG. 2 depicts an isometric exploded view of the example RF filter system of FIG. 1. The RF filter system 100 depicted in FIG. 1 includes a waveguide 136 and a resonator cavity filter 102. The resonator cavity filter 102, in this example, includes two tubular sections 104 that are bolted together via circumferential flanges located at the ends of each of the tubular sections 104. Aperture plates 142 may be mounted to the ends of the tubular sections 104 and may serve as bulkheads that support the tubular sections 104 in addition to providing wave-shaping apertures designed to tailor the RF signal passing through the resonator cavity filter 102. In this example, the aperture plates 142 are connected to mounting interface brackets 144, which allow the RF filter system to be mounted to a mounting surface (not shown) such that a center axis 110 of the tubular sections 104 is substantially parallel to the mounting surface. Each tubular section 104 may include one or more tuning screws 138 that are positioned such that they may be extended into, or retracted from, the tubular sections 104 along radial axes of the tubular sections 104.

Figure 3:
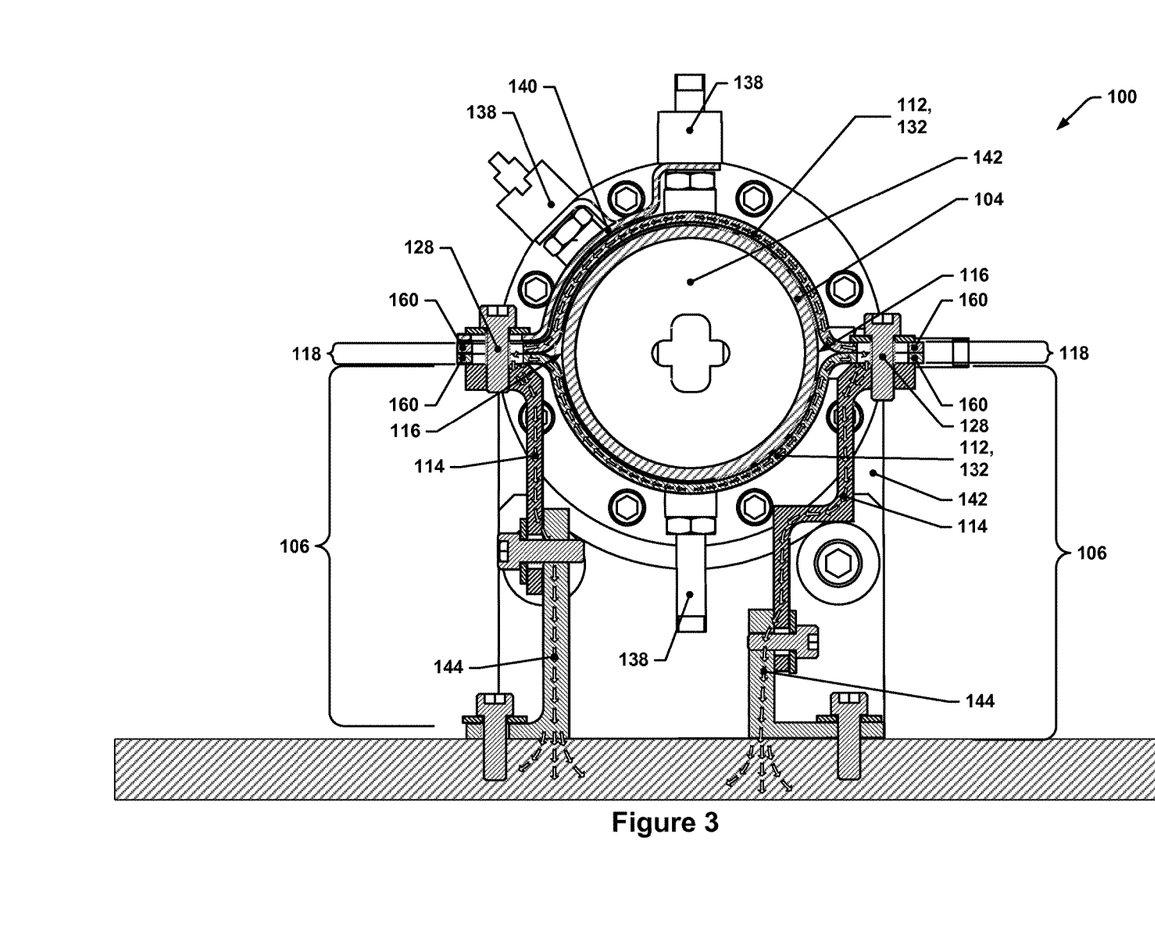
FIG. 3 depicts a section view of the example RF filter system of FIG. 1 through the section plane in FIG. 1.

FIG. 3 depicts a section view of the example RF filter system of FIG. 1 through the section plane 172 in FIG. 1. In this view, a mounting surface 108 has been added as well. As can be seen, an outer surface 116 of the tubular section 104 is encircled or partially encircled by the thermally conductive structure 112, which is provided, in this example, by two C-shaped pieces 132. Each of the C-shaped pieces 132 has tabs 160 located at opposing ends, and the tabs 160 may be bolted together using bolts 128 to form thermally conductive flanges 118. The thermally conductive flanges 118 may extend away from the tubular section 104 in directions that are substantially parallel to the mounting surface 108. The resonator cavity filter 102 may be connected with the mounting surface 108 via a mounting interface 106, which may include mounting interface brackets 144 and heat transfer legs 114. The mounting interface brackets 144 may also include features that provide structural support to the resonator cavity filter 102, e.g., features that may mount to the aperture plates 142. It is to be understood that the mounting interface brackets 144 may also be viewed as forming "part" of the heat transfer legs 114, e.g., the portions of the mounting interface brackets 144 that conduct heat from the heat transfer legs 114 to the mounting surface 108 may be viewed as part of the heat transfer legs 114, even though they may be separate components from the heat transfer legs 114.

Also visible in FIG. 3 is an auxiliary heat path 140, which may be clamped against one of the C-shaped pieces 132 and thermally conductive flanges 118. The auxiliary heat path 140 may serve to conduct heat from some or all of the tuning screws 138 to one or more of the heat transfer legs 114.

Figure 4:
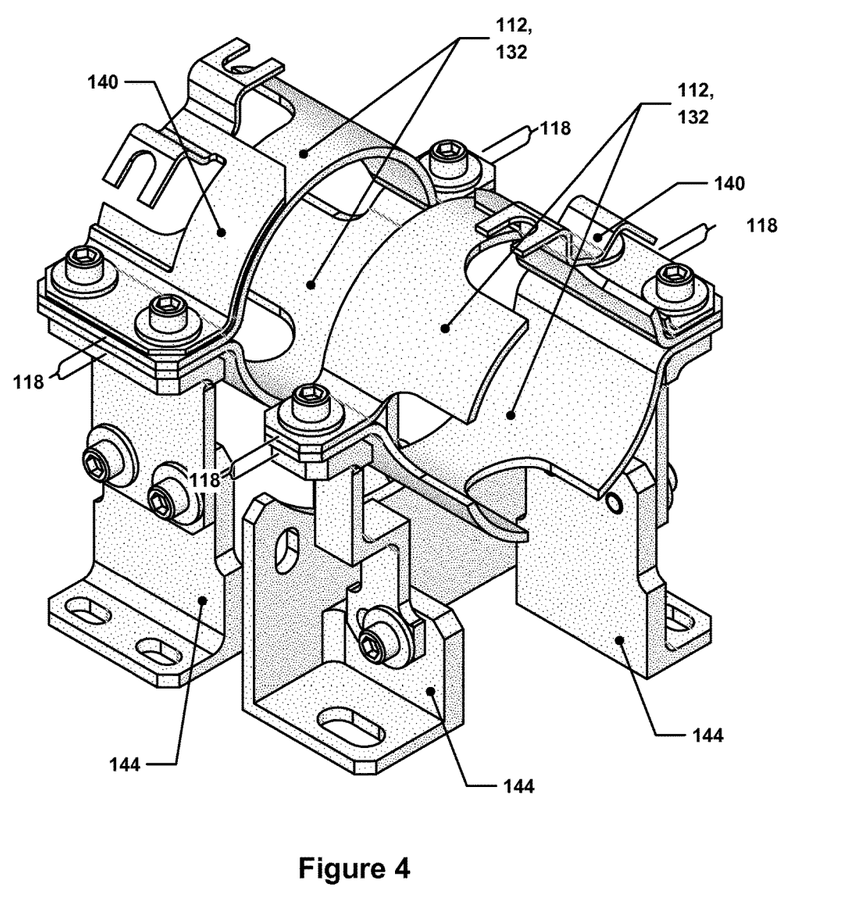
FIG. 4 depicts an isometric view of the heat transfer components of the RF filter system of FIG. 1 with all other components of the RF filter system removed.
Figure 5:
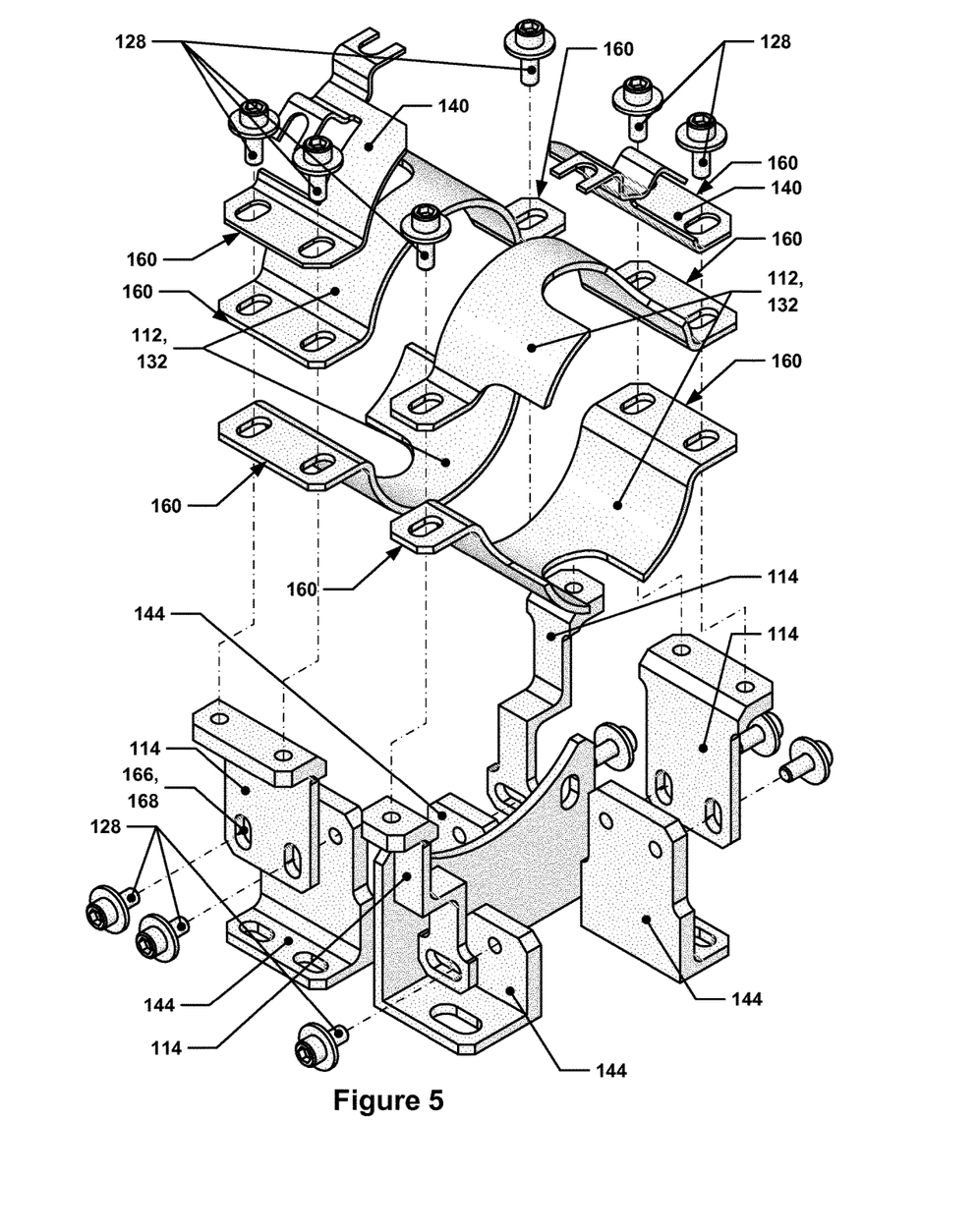
FIG. 5 depicts an exploded isometric view of the heat transfer components as shown in FIG. 4.

FIG. 4 depicts an isometric view of the heat transfer components of the RF filter system of FIG. 1 with all other components of the RF filter system removed. FIG. 5 depicts an exploded isometric view of the heat transfer components as shown in FIG. 4. As can be seen, the assembly is formed from a large number of discrete pieces, which may provide for increased adjustability and assembly flexibility. However, it is to be understood that other implementations may combine some of these pieces into single, integrated components. For example, instead of the heat transfer leg 114 being bolted to a mounting interface bracket 144, the heat transfer leg 114 and the mounting interface bracket 144 may be made as a single integrated component, thereby eliminating a bolted connection (although also losing some degree of assembly flexibility). In the implementation shown, however, some of the heat transfer legs 114 include holes or slots 166 or 168 in them that allow a bolt 128 to be passed through such heat transfer legs 114 and threaded into a threaded hole in one of the mounting interface brackets 144. This may allow for some assembly tolerance in the system. If necessary, the bolt 128 securing such a connection may be loosened, the components adjusted, and the bolt 128 re-tightened.

Generally speaking, the heat transfer components shown in FIGS. 4 and 5 may be made from one or more different materials, although the material or materials selected may all generally possess thermal conductivities of 350 W/(m·K) or higher. The bolts 128 (and, if used, nuts and/or washers) may be made of a similar high-thermal conductivity material, although such fastening components may also be made of lower thermal conductivity materials such as stainless steel. The heat transfer components may also include incidental features, such as threaded inserts, that may be made from a lower thermal conductivity material, such as steel, although the bulk of such heat transfer components may generally be made from the higher thermal conductivity material.

Figure 6:
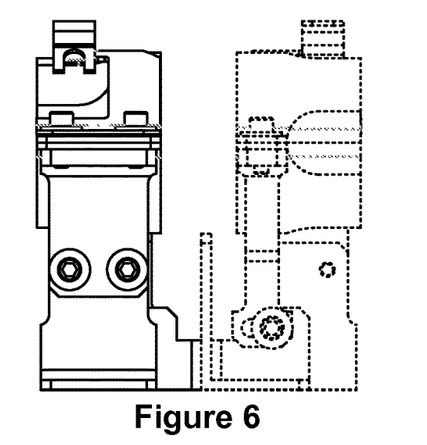
FIGS. 6 through 8 depict side, top, and bottom views, respectively, of the heat transfer components.
Figure 7:
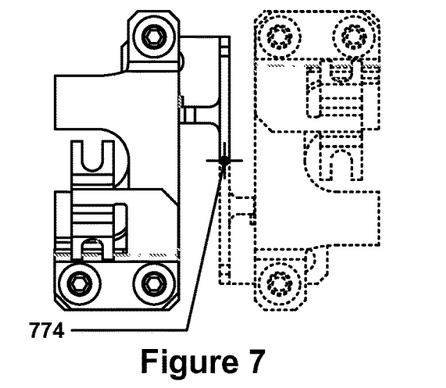
Figure 8:
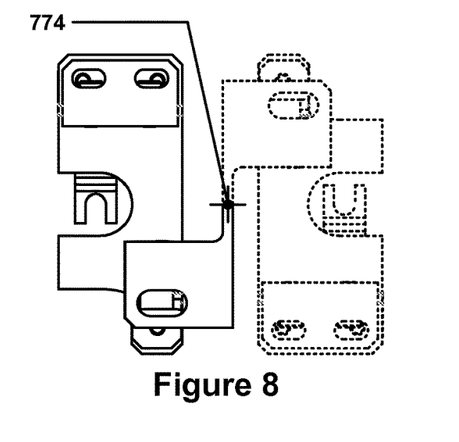

In the example implementation shown in FIGS. 4 and 5, it may be observed that the components exhibit bilateral radial symmetry. FIGS. 6 through 8 depict side, top, and bottom views, respectively, of the heat transfer components. As can be seen in FIGS. 7 and 8, the portion of the heat transfer components depicted in solid lines is duplicated and rotated 180° about a center point 774 to form the portion of the heat transfer components depicted in dotted lines. As such, the heat transfer components can be installed in either of two orientations without any change in performance, reducing the likelihood of incorrect installation.

Figure 9:
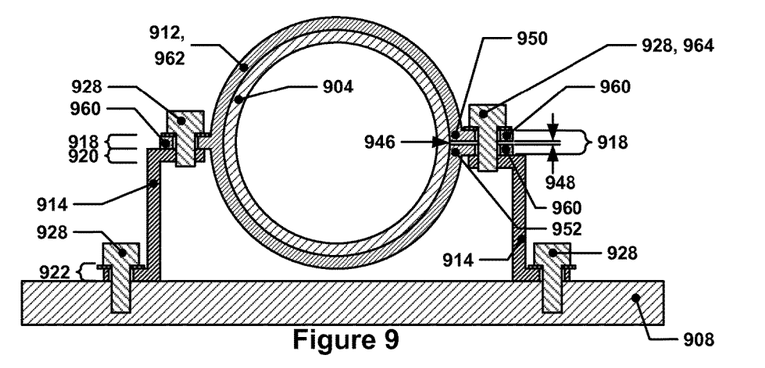
FIG. 9 depicts a section view of an example resonator cavity filter and heat transfer component arrangement.
Figure 10:
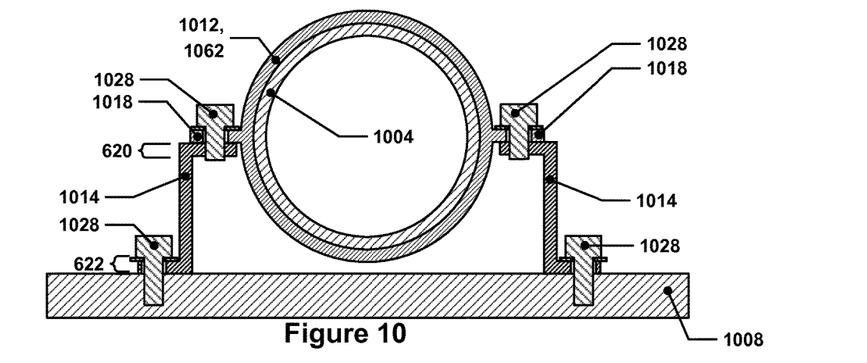
FIG. 10 depicts a section view of another example resonator cavity filter and heat transfer component arrangement.
Figure 11:
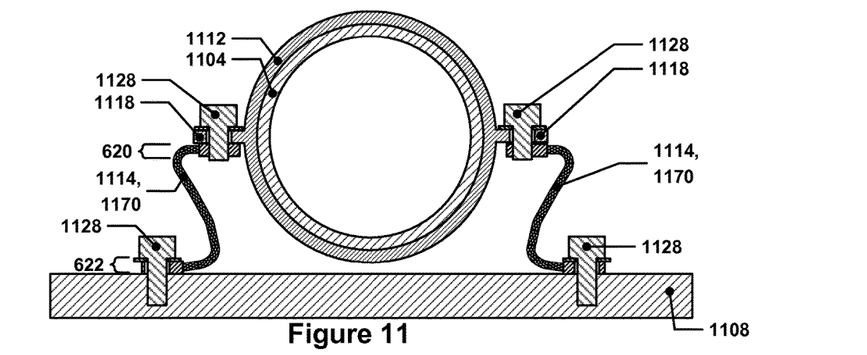
FIG. 11 depicts a section view of yet another example resonator cavity filter and heat transfer component arrangement.

In FIGS. 9 through 11, components that are similar to components discussed above with respect to FIGS. 1 through 8 are indicated by callouts sharing the same last two digits as the earlier-discussed components. In the interest of conciseness and unless indicated otherwise, the previous description of such corresponding components may be referred to for descriptions of the components in FIGS. 9 through 11.

FIG. 9 depicts a section view of an example resonator cavity filter and heat transfer component arrangement. In FIG. 9, the resonator cavity filter has a tubular section 904 that is encircled by a thermally conductive structure 912 that is a hoop 962 that has a slit 946 in it; the slit 946 may define a first end 950 and a second end 952 of the hoop 962. The hoop 962 may have a tab 960 extending away from the side of the hoop 962 opposite the slit 946, as well as two tabs 960 extending away from the first end 950 and the second end 952, respectively. The tabs 960 located on either side of the hoop may form thermally conductive flanges 918 that may be used to mount the resonator cavity filter to proximal portions 920 of heat transfer legs 914; distal portions 922 of the heat transfer legs 914 may be mounted to a mounting surface 908. The tabs 960 extending from the first end 950 and the second end 952 may define a circumferential gap 948 between them, and may be drawn together by a clamping mechanism 964, which may be provided by one of the bolts 928 that are used to assemble the heat transfer components together. This arrangement utilizes a single-piece thermally conductive structure, as opposed to the use of two C-shaped pieces such as in the prior example.

FIG. 10 depicts a section view of another example resonator cavity filter and heat transfer component arrangement. In FIG. 10, as in FIG. 9, the resonator cavity filter has a tubular section 1004 that is encircled by a thermally conductive structure 1012 that is a hoop 1062. In contrast to the hoop 962, however, the hoop 1062 is unbroken. The hoop 1062 may have tabs extending away from the sides of the hoop 1062 in directions generally parallel to a mounting surface 1008. The tabs located on either side of the hoop may form thermally conductive flanges 1018 that may be used to mount the resonator cavity filter to proximal portions 1020 of heat transfer legs 1014 using bolts 1028; distal portions 1022 of the heat transfer legs 1014 may be mounted to a mounting surface 1008 using other bolts 1028. Such a continuous thermally conductive structure 1012 may be suitable for resonator cavity filters in which the tubular section 1004 does not increase in diameter in at least one direction from the location about which the thermally conductive structure 1012 encircles the tubular section 1004, e.g., a tubular section lacking a bolt thermally conductive flange on at least one end. In such implementations of a continuous thermally conductive structure 1012, the inner diameter of the thermally conductive structure 1012 may be sized slightly larger, e.g., 0.005 or 0.010 inches larger, than the outer diameter of the tubular section 1004 at the location where the thermally conductive structure 1012 encircles the tubular section 1004 in order to allow the thermally conductive structure 1012 to be slid onto the tubular section 1004. In other such implementations, the thermally conductive structure 1012 may have an inner diameter that is slightly smaller, e.g., by 0.002 to 0.010 inches, than the outer diameter of the tubular section 1004 at the location where the thermally conductive structure 1012 encircles the tubular section 1004. In such implementations, the thermally conductive structure 1012 may be heated, thus causing it to expand, prior to sliding it over the tubular section 1004. After being positioned on the tubular section 1004, the thermally conductive structure 1012 may be cooled and then clamp firmly around the tubular section 1004, thus forming a tight surface-to-surface contact that provides good thermally conductive heat transport from the resonator cavity filter to the thermally conductive structure.

FIG. 11 depicts a section view of yet another example resonator cavity filter and heat transfer component arrangement. The implementations shown in FIG. 11 is very similar to that shown in FIG. 10, except that the heat transfer legs 1114 include a braided flexible portion 1170 that spans between the proximal portion 1120 and the distal portion 1122. The braided flexible portion 1170 may be made from a woven material, e.g., woven copper strands, that have a high thermal conductivity. In such an implementation, the heat transfer legs 1114 may not provide much, if any, structural support to the resonator cavity filter—such support may instead be provided by other components, such as by aperture plates (not shown, but similar to the aperture plates discussed earlier in this paper).

Figure 12:
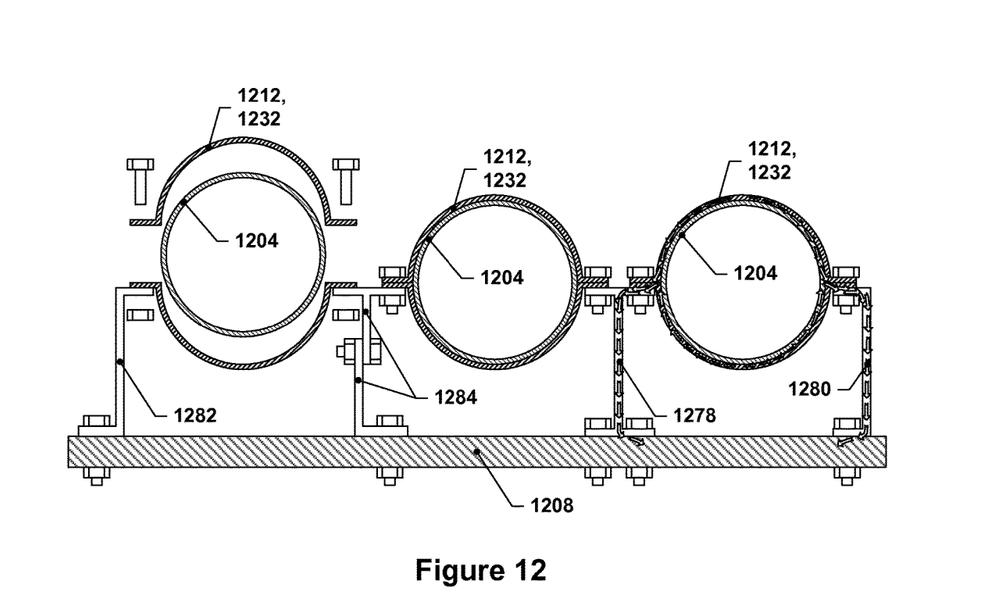
FIG. 12 depicts three example RF filter systems with attendant heat transfer components, and depicts a variety of different types of heat transfer legs.

In addition to the variations in the thermally conductive structures discussed above, other implementations of the heat transfer components may include other types of heat transfer legs. FIG. 12 depicts three example RF filter systems with attendant heat transfer components, and depicts a variety of different types of heat transfer legs. The left-most RF-filter system is shown in a partially-exploded configuration, the middle RF-filter system is shown in an assembled configuration, and the right-most RF-filter system is shown in an assembled configuration with arrows showing the direction of heat flow through the heat transfer components.

Each RF-filter system shown includes resonator cavity filter including a tubular section 1204, and each tubular section 1204 is encircled by a thermally conductive structure 1212 formed by two C-shaped pieces 1232. As can be seen in this implementation, there are several different types of heat transfer legs evident. On the left-most side, an S-shaped heat transfer leg 1282 is shown. To the right of the S-shaped heat transfer leg 1282 is a dual-support heat transfer leg 1284, which is formed from two pieces that are bolted together. The dual-support heat transfer leg 1284 has an enlarged proximal portion such that it can be connected with, and receive heat from, two adjacent thermally conductive structures 1212. To the right of the dual-support heat transfer leg 1284 is an I-beam heat transfer leg 1278, which also features an enlarged proximal portion that allows it to be connected with two adjacent thermally conductive structures 1212. Finally, the on the right-most side, a C-shaped heat transfer leg 1280 is shown.

It is to be understood that any of the heat transfer leg types shown in this paper may be modified to have enlarged (or reduced) proximal portions to allow for connection of the heat transfer legs to two adjacent thermally conductive structures (or one thermally conductive structure).

Figure 13:
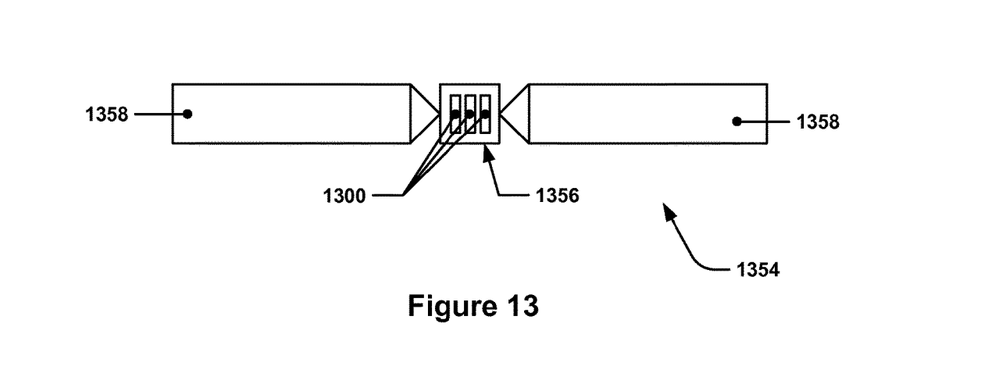
FIG. 13 depicts an example spacecraft with resonator cavity filter systems installed.

The resonator cavity filter systems discussed herein may be implemented on a spacecraft. FIG. 13 depicts an example spacecraft with resonator cavity filter systems installed. The spacecraft 1354 may include a main body 1356 that has solar panels 1358 extending away from it. The spacecraft 1354 may also include various other systems, including one or more RF filter systems 1300 that may include resonator cavity filters and heat transfer components discussed above. The RF filter systems 1300 may be mounted to an exterior surface of the main body 1356, or may be mounted to a surface within the main body 1356, depending on the design.

Various other implementations of the concepts discussed herein are also to be understood as falling within the scope of this disclosure. For example, in some implementations, the thermally conductive flanges that connect the thermally conductive structures to the heat transfer legs may extend from the same general locations as in the implementations discussed above, e.g., from locations on opposite sides of the thermally conductive structure and at the same nominal distance from the mounting surface, but in another direction, e.g., directly towards the mounting surface. In some other or additional implementations, the thermally conductive flanges may be integrated with the heat transfer legs to form integrated heat transfer leg/thermally conductive flange pieces.

As discussed earlier, the thermally conductive structures and heat transfer legs for resonator cavity filter heat management may be made from a material or materials having a thermal conductivity or thermal conductivities of 350 W/(m·K) or greater. Such materials may include copper, copper alloys, silver, silver alloys, gold, gold alloys, as well as composites utilizing graphite, graphene, or mesophase pitch carbon fibers. In the case of a heat transfer leg that has a flexible, braided portion, such materials may be woven from thin, continuous strands of such materials.

It is to be understood that the thermally conductive structures discussed herein may, in some implementations, tightly clamped to the tubular section or sections of an RF filter system in order to effect good thermal contact between such components. In some other implementations, however, there may be a small gap between the tubular sections and the thermally conductive structures in at least some locations. In such implementations, a thermal interface material, e.g., a conformal thermal interface paste, may be applied between the tubular section and the thermally conductive structure to facilitate a thermally conductive heat transfer pathway. Such a conformal thermal interface material may also be applied between the tubular section(s) and the thermally conductive structure(s) even in implementations where the thermally conductive structure(s) are clamped tightly around the tubular section(s); this may help fill any micro-gaps that arise due to the surface roughness of the components.

Generally speaking, the proximal portions of each pair of heat transfer legs bracketing a tubular section of the implementations discussed above may be spaced apart by at least the diameter of the tubular section interposed between each such pair of heat transfer legs at the location where the thermally conductive structure encircles or partially encircles the tubular section.

Although several implementations of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

The invention claimed is:

1. An apparatus comprising:
a resonator cavity radio frequency (RF) filter including a first tubular section; and
a heat transfer arrangement configured to thermally couple the first tubular section with a mounting surface when the resonator cavity RF filter is mounted to the mounting surface, the heat transfer arrangement including:
a plurality of heat transfer legs; and
one or more thermally conductive structures, each thermally conductive structure at least partially encircling a first outer surface of the first tubular section and in thermally conductive contact with the first outer surface, wherein:
each thermally conductive structure is coupled with a pair of oppositely disposed thermally conductive flanges, each thermally conductive flange extending away from the first tubular section and in a direction substantially parallel to the mounting surface when the resonator cavity RF filter is mounted to the mounting surface, wherein:
each thermally conductive flange is coupled with a proximal portion of at least one of the heat transfer legs,
each heat transfer leg has a distal portion that is configured to couple the heat transfer leg with the mounting surface, and
the one or more thermally conductive structures, the thermally conductive flanges, and the heat transfer legs are made from a material or materials having a thermal conductivity or thermal conductivities of at least $$\frac{W}{m \cdot K}.$$

2. The apparatus of claim 1, wherein the one or more thermally conductive structures and the heat transfer legs coupled thereto are made from copper or copper alloy.

3. The apparatus of claim 1, wherein the resonator cavity RF filter further includes a tuning screw that protrudes through a wall of the first tubular section to allow for tuning of a filtering characteristic of the resonator cavity RF filter.

4. The apparatus of claim 1, wherein:
at least one of the one or more thermally conductive structures includes two C-shaped halves, and
each thermally conductive flange of the at least one of the one or more thermally conductive structures is formed by two tabs, each tab extending from an end of each of the C-shaped halves.

5. The apparatus of claim 1, wherein:
at least one of the one or more thermally conductive structures is a hoop with a slit forming a circumferential gap between a first end of the hoop and a second end of the hoop, and
the at least one of the one or more thermally conductive structures includes a clamping mechanism configured to draw the first end of the hoop towards the second end of the hoop to reduce the circumferential gap when the clamping mechanism is engaged.

6. The apparatus of claim 1, wherein:
at least one of the one or more thermally conductive structures is an unbroken hoop having an inner diameter within 0.26 mm of the diameter of the first outer surface in the location where the at least one of the one or more thermally conductive structures at least partially encircles the first tubular section.

7. The apparatus of claim 1, further comprising a conformal thermal interface material that is interposed between the first tubular section and at least one of the one or more thermally conductive structures.

8. The apparatus of claim 1, wherein at least one of the heat transfer legs includes two pieces, and at least one of the pieces includes a hole or slot through which a fastener may be passed in order to connect the piece to the other piece, wherein the hole or slot is sized so as to allow the distance between the distal portion of the heat transfer leg and proximal portion of the heat transfer leg to be changed when the fastener is in a loosened state.

9. The apparatus of claim 1, wherein the heat transfer legs coupled with at least one of the one or more thermally conductive structures are spaced apart from one another by at least the diameter of the first tubular section at the location where that thermally conductive structure encircles the first tubular section.

10. The apparatus of claim 1, wherein at least one of the heat transfer legs includes a braided, flexible portion in between the proximal portion and the distal portion.

11. A spacecraft, the spacecraft comprising:
a main body;
a mounting surface located on or in the main body;
a payload subsystem including:
a resonator cavity radio frequency (RF) filter including a first tubular section; and
a heat transfer arrangement configured to thermally couple the first tubular section with a mounting surface when the resonator cavity RF filter is mounted to the mounting surface, the heat transfer arrangement including:
a plurality of heat transfer legs; and
one or more thermally conductive structures, each thermally conductive structure at least partially encircling a first outer surface of the first tubular section and in thermally conductive contact with the first outer surface, wherein:

each thermally conductive structure is coupled with a pair of oppositely disposed thermally conductive flanges, each thermally conductive flange extending away from the first tubular section and in a direction substantially parallel to the mounting surface when the resonator cavity RF filter is mounted to the mounting surface, each thermally conductive flange is coupled with a proximal portion of at least one of the heat transfer legs, each heat transfer leg has a distal portion that is configured to couple the heat transfer leg with the mounting surface, and the one or more thermally conductive structures, the thermally conductive flanges, and the heat transfer legs are made from a material or materials having a thermal conductivity or thermal conductivities of at least $$350 \frac{W}{m \cdot K}.$$

12. The spacecraft of claim 11, wherein the one or more thermally conductive structures and the heat transfer legs coupled thereto are made from copper or copper alloy.

13. The spacecraft of claim 11, wherein the resonator cavity RF filter further includes a tuning screw that protrudes through a wall of the first tubular section to allow for tuning of a filtering characteristic of the resonator cavity RF filter.

14. The spacecraft of claim 11, wherein:
at least one of the one or more thermally conductive structures includes two C-shaped halves, and
each thermally conductive flange of the at least one of the one or more thermally conductive structures is formed by two tabs, each tab extending from an end of each of the C-shaped halves.

15. The spacecraft of claim 11, wherein:
at least one of the one or more thermally conductive structures is a hoop with a slit forming a circumferential gap between a first end of the hoop and a second end of the hoop, and
the at least one of the one or more thermally conductive structures includes a clamping mechanism configured to draw the first end of the hoop towards the second end of the hoop to reduce the circumferential gap when the clamping mechanism is engaged.

16. The spacecraft of claim 11, wherein:
at least one of the one or more thermally conductive structures is an unbroken hoop having an inner diameter within 0.26 mm of the diameter of the first outer surface in the location where the at least one of the one or more thermally conductive structures at least partially encircles the first tubular section.

17. The spacecraft of claim 11, further comprising a conformal thermal interface material that is interposed between the first tubular section and at least one of the one or more thermally conductive structures.

18. The spacecraft of claim 11, wherein at least one of the heat transfer legs includes two pieces, and at least one of the pieces includes a hole or slot through which a fastener may be passed in order to connect the piece to the other piece, wherein the hole or slot is sized so as to allow the distance between the distal portion of the heat transfer leg and the proximal portion of the heat transfer leg to be changed when the fastener is in a loosened state.

19. The spacecraft of claim 11, wherein the heat transfer legs coupled with at least one of the one or more thermally conductive structures are spaced apart from one another by at least the diameter of the first tubular section at the location where that thermally conductive structure encircles the first tubular section.

20. The spacecraft of claim 11, wherein at least one of the heat transfer legs includes a braided, flexible portion in between the proximal portion and the distal portion.

21. An apparatus comprising:
a resonator cavity radio frequency (RF) filter including:
at least one tubular section with a center axis and having an external diameter D; and
a thermally conductive path configured to conduct heat from the at least one tubular section to a mounting surface when the resonator cavity RF filter is mounted to the mounting surface, the at least one thermally conductive path including:
one or more heat straps; and
a plurality of thermally conductive heat transfer legs, wherein:
each heat strap is disposed around and thermally coupled with an outer surface of the at least one tubular section,
each heat strap is configured to conduct heat flowing outward from the outer surface in a direction substantially parallel to the mounting surface when the resonator cavity RF filter is mounted to the mounting surface, and
each heat strap is configured to be conductively coupled with the mounting surface by at least two heat transfer legs when the resonator cavity RF filter is mounted to the mounting surface, each heat transfer leg including a proximal portion configured to be coupled with the heat strap at a location spaced a distance of at least D/2 from the center axis and parallel to the mounting surface when the resonator cavity RF filter is mounted to the mounting surface and a distal portion that is coupled with the mounting surface when the resonator cavity RF filter is mounted to the mounting surface.

* * * * *

UNITED STATES PATENT AND TRADEMARK OFFICE
CERTIFICATE OF CORRECTION

PATENT NO. : 10,056,668 B2
APPLICATION NO. : 14/864669
DATED : August 21, 2018
INVENTOR(S) : Hoover R. Lee et al.

It is certified that error appears in the above-identified patent and that said Letters Patent is hereby corrected as shown below:

In the Claims

Claim 1 (Column 11, Line 65) change "W/m·K" to "350 W/m·K".

Signed and Sealed this
Sixth Day of June, 2023

*Katherine Kelly Vidal*

Katherine Kelly Vidal
*Director of the United States Patent and Trademark Office*